US009275284B2

(12) United States Patent
Gurbuz (10) Patent No.: US 9,275,284 B2
(45) Date of Patent: *Mar. 1, 2016

(54) METHOD AND APPARATUS FOR EXTRACTION OF STATIC SCENE PHOTO FROM SEQUENCE OF IMAGES

(71) Applicant: SONY CORPORATION, Tokyo (JP)

(72) Inventor: Sabri Gurbuz, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 14/265,688

(22) Filed: Apr. 30, 2014

(65) Prior Publication Data
US 2015/0317520 A1    Nov. 5, 2015

(51) Int. Cl.
| | |
|---|---|
| G06K 9/00 | (2006.01) |
| G06F 17/30 | (2006.01) |
| G06K 9/46 | (2006.01) |
| G06T 1/60 | (2006.01) |
| H04N 5/91 | (2006.01) |

(52) U.S. Cl.
CPC ........ *G06K 9/00711* (2013.01); *G06F 17/3028* (2013.01); *G06K 9/46* (2013.01); *G06K 9/4604* (2013.01); *G06T 1/60* (2013.01); *H04N 5/91* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 7,483,062 B2 | 1/2009 | Allman et al. | |
| 2003/0165193 A1 | 9/2003 | Chen et al. | |
| 2004/0223652 A1* | 11/2004 | Cetin et al. | 382/235 |
| 2006/0262960 A1 | 11/2006 | LeClerc et al. | |
| 2008/0273751 A1* | 11/2008 | Yuan et al. | 382/103 |
| 2009/0074246 A1* | 3/2009 | Distante et al. | 382/103 |
| 2009/0231453 A1* | 9/2009 | Huang | 348/220.1 |
| 2013/0011049 A1 | 1/2013 | Kimura et al. | |
| 2013/0169834 A1* | 7/2013 | Herz et al. | 348/220.1 |

OTHER PUBLICATIONS

RR Schultz and RL Stevenson, "Extraction of High-Resolution Frames from Video Sequences," IEEE Transactions on Image Processing, vol. 5, No. 6, Jun. 1996.*

O Barnich and M Van Droogenbroeck, "ViBe: A Universal Background Subtraction Algorithm for Video Sequences," IEEE Transactions on Image Processing, vol. 20, No. 6, Jun. 2011.*

\* cited by examiner

*Primary Examiner* — Matthew Bella
*Assistant Examiner* — Soo Shin
(74) *Attorney, Agent, or Firm* — John P. O'Banion (57) ABSTRACT

An apparatus and method for extracting a static background image from a non-static image sequence or video sequence having at least three spatially overlapping frames is presented. Obscured static background areas are filled, according to the disclosure, with actual content as the background area becomes visible over time as non-static objects move with respect to the background. Consecutive image frames are stored in tracking buffers from which alignment is performed and absolute differences determined. Object contours are found in the difference image and bounding boxes determined as object masks. The background is then filled from areas outside these object masks to arrive at a static background image.

20 Claims, 7 Drawing Sheets

FIG. 6

METHOD AND APPARATUS FOR EXTRACTION OF STATIC SCENE PHOTO FROM SEQUENCE OF IMAGES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Field of the Technology

This disclosure pertains generally to video processing, and more particularly to extracting a static background image from a non-static image sequence, or video sequence.

2. Background Discussion

This disclosure pertains generally to image or video sequence processing, and more particularly to a background extraction apparatus and method.

Background extraction is a process by which a static background image is created from the frames of a non-static (motion inclusive) video sequence. The resultant extracted background is free from the non-static objects which were contained in the video, while all locations of the background which were obscured by moving objects have been filled.

The use of a background extraction process from an image sequence or sequence of video frames can be important in numerous image and video applications (e.g., post production). However, performing background extraction can be a complex process resulting in a background containing an undesired level of artifacts, visible boundaries, fills, and other distracting shortcomings. And in many cases the software for performing existing background extraction is not well-suited for real-time operation, such as on cameras and mobiles devices.

Accordingly, a need exists for a practical background extraction apparatus and method which is sufficiently simple for real time implementation in various applications, including on cameras and mobile devices.

BRIEF SUMMARY OF THE TECHNOLOGY

The present technology is an apparatus and method for extracting a static scene image (photo) from a sequence of images, or video sequence, by removing any foreground moving objects, such as people, cars, birds, and similar non-static objects, and filling the object locations with the actual static scene image recovered in time. Receiving a sequence of spatially overlapping obscured images, the apparatus extracts the obscured static background area as the background area becomes visible in time. As a result, this apparatus and method facilitates a photographer to extract the static scene image of the desired scene from a short video (a sequence of images) even when the scene is obscured by moving objects all the time.

Background extraction can be a beneficial process utilized for the digital/mobile camera industry for creating new type of photos and motion videos from ordinary videos, as well as for content-retrieval systems, tracking, and surveillance in certain applications, and as a key technology for use in object segmentation which utilizes a background subtraction process.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosure will be more fully understood by reference to the following drawings which are for illustrative purposes only.

DETAILED DESCRIPTION

Figure 1:
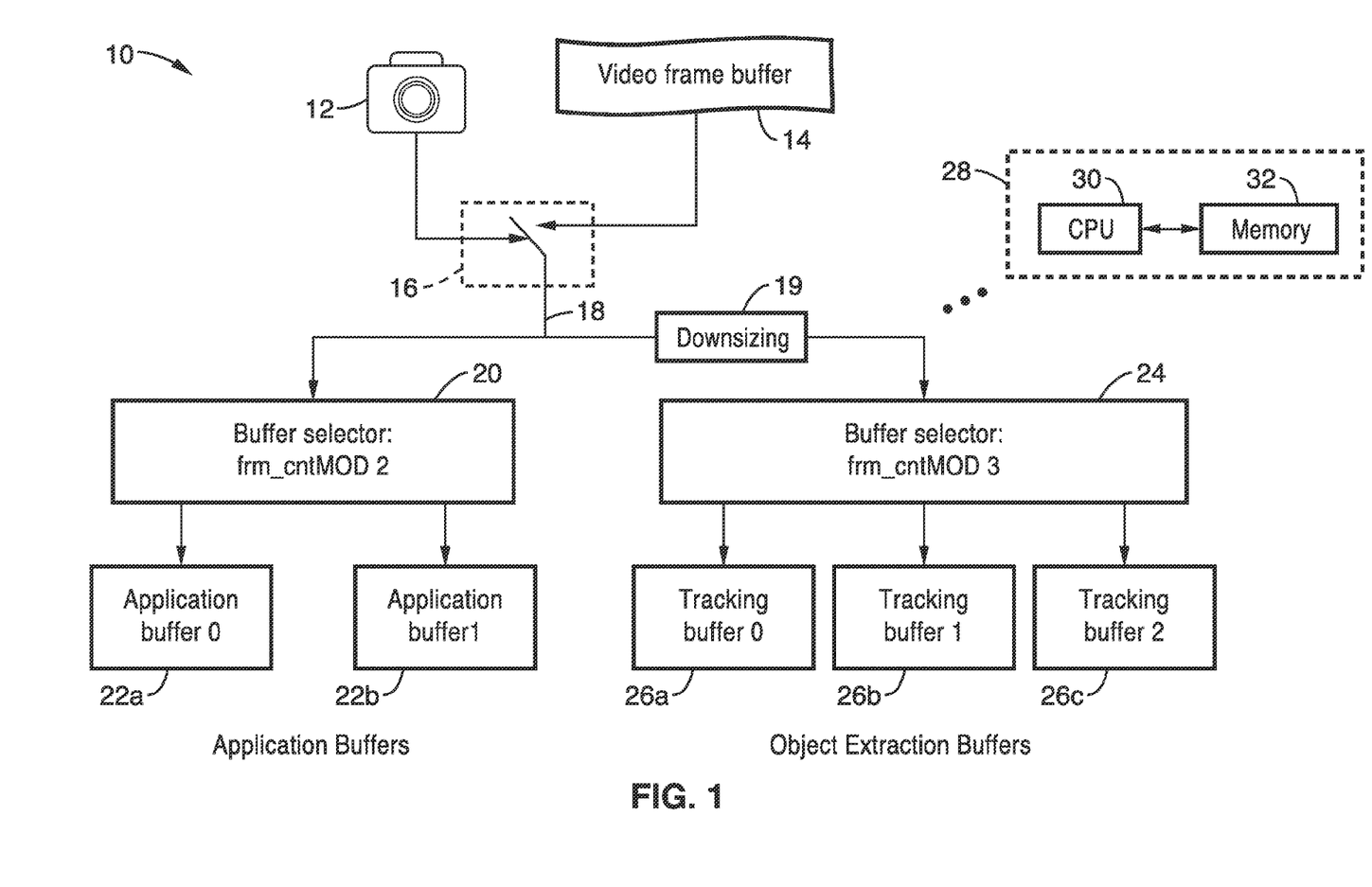
FIG. 1 is a block diagram of image buffering performed according to an embodiment of the present disclosure.

FIG. 1 illustrates an example embodiment 10 of an apparatus upon which the inventive background image processing is performed. As seen from the block diagram, the image sequence being processed may be received from either a camera 12, or from a video frame buffer 14, such as contained within a video processing system or other device for retaining video frames. Switch 16 in the figure merely represents that there are multiple options for video frame sequence 18 to be received for inventive processing.

Incoming image frames (e.g., video) in frame sequence 18 are stored in full size through buffer selector 20 in dual application buffers 22a, 22b. These incoming frames are also downsized 19 and stored in object extraction buffers, which are implemented in this embodiment through a tracking buffer selector 24 with tracking buffers 26a through 26c.

To understand the operation of buffer selection, consider the case where there are three pointers pointing to buffer0, buffer1 and buffer2, and it is desired to extract moving objects at frame #67 of a video. Then frame #65 (I1), frame #66 (I2), and frame #67 (I3) will be contained in the buffers. Accordingly, buffer pointers contain (67-2) MOD 3=1, (67-1) MOD 3=0, (67-0) MOD 3=2. That is, prv_ptr for I1 will point to buffer1, cur_ptr for I2 will point to buffer0, and next_ptr for I3 will point to buffer2. When the frame number advances to 68, the inventive apparatus only changes pointer addresses where they point to depending on MOD arithmetic: prv_ptr=Buffer[66 MOD 3], cur_ptr=buffer[67 MOD 3], next_ptr=buffer[68 MOD 3]. Accordingly, the apparatus does not require copying images from one buffer to another.

Control of input, buffer selection 20, as well as performing the actual background extraction process from tracking buffers 22a through 22c are preferably performed by at least one processing element or device 28, such as including at least one computer processor 30 (e.g., CPU, microprocessor, microcontroller, DSP, ASIC with processor, and so forth), operating in conjunction with at least one memory 32. It will be appreciated that programming is stored on memory 32, which can include various forms of solid state memory and computer-readable media, for execution by computer processor 30. The present technology is non-limiting with regard to types of memory and/or computer-readable media, insofar as these are non-transitory, and thus not constituting a transitory electronic signal.

Figure 2:
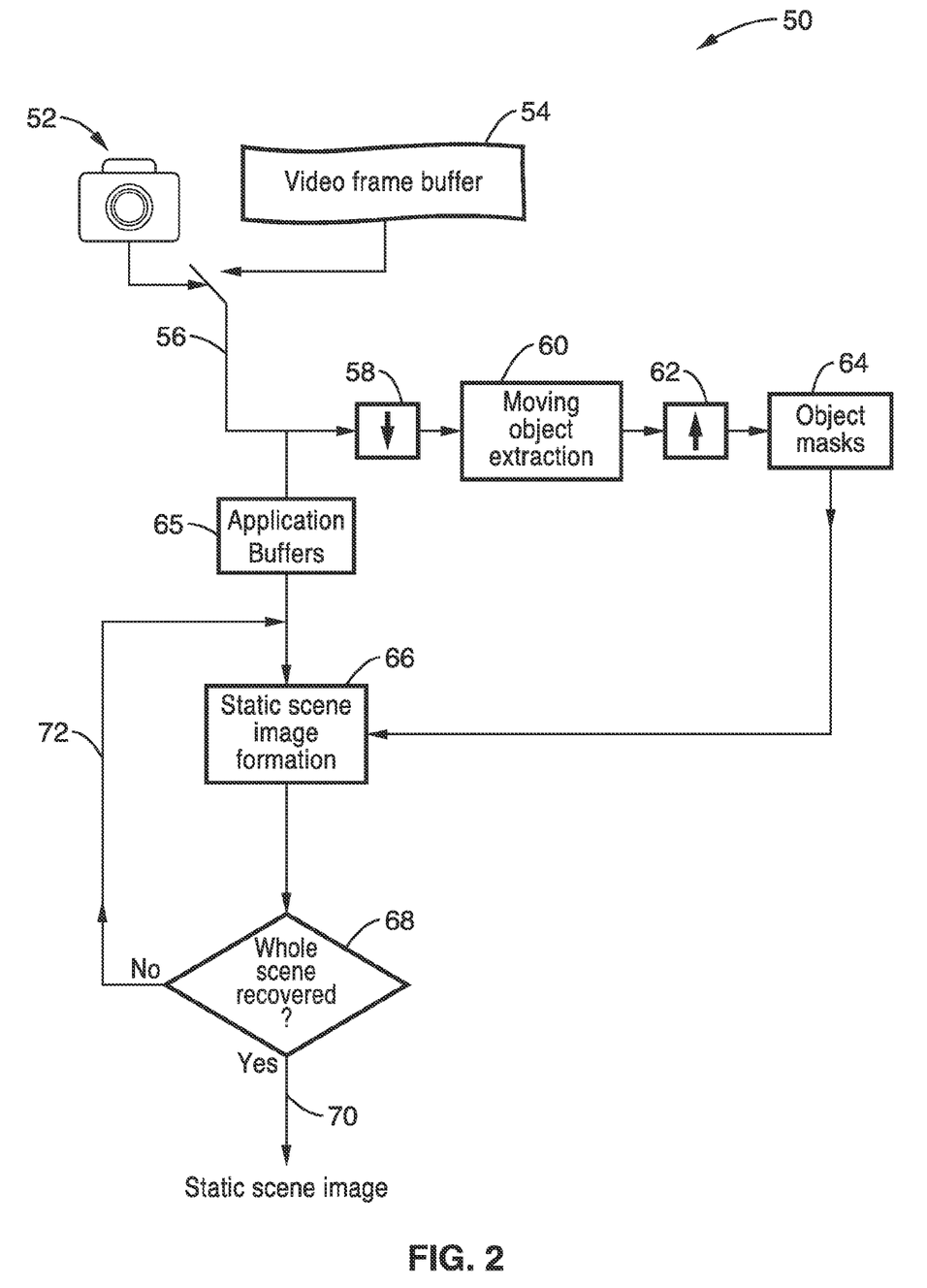
FIG. 2 is flow diagram of a static scene image extraction method according to an embodiment of the present disclosure.

FIG. 2 illustrates an example embodiment 50 of performing background image extraction. The image sequence being processed may be selected 56 either from a camera 52 or from a video frame buffer 54. Incorporated within background image extraction of this technology is a moving object detection process, seen in blocks 58 through 64. The information generated from moving object detection is utilized for removing these objects from the scene in forming a static image as seen in blocks 65, and 66 through 72.

In particular, after downsizing 58, a process of moving object extraction 60 is performed for which a detailed flow diagram is provided in FIG. 5A through FIG. 5B described later. The object extraction process is performed utilizing three consecutive images from the tracking buffers (26a through 26c in FIG. 1). In general the extraction process involves aligning these images using an image alignment process (e.g., global whole frame image alignment method from Sony). Then, the absolute difference between the buffer0 and buffer1 and buffer2 and buffer1 are calculated. A relative threshold operation is executed for detecting the rough object contours in these two difference images. The resulting contour images are intersected to obtain the object contours corresponding to the center buffer (buffer1) image. Then, the bounding box of each object in the buffer1 is located to detect a generous object mask for each object.

Once the objects are detected 60 then the object information is upsized 62 into full size object masks 64 for use with application buffers, such as 22a-22b seen in FIG. 1. Static scene background image formation 66 is then performed on application buffers 65. Forming of the static image is preferably an iterative process until moving objects have been replaced with the background for all portions of the scene, so that if the whole scene has not yet been recovered 68, then additional processing 72 is performed with further static scene formation 66. Once all portions of the scene have been processed, then the full static scene is available 70.

Figure 3:
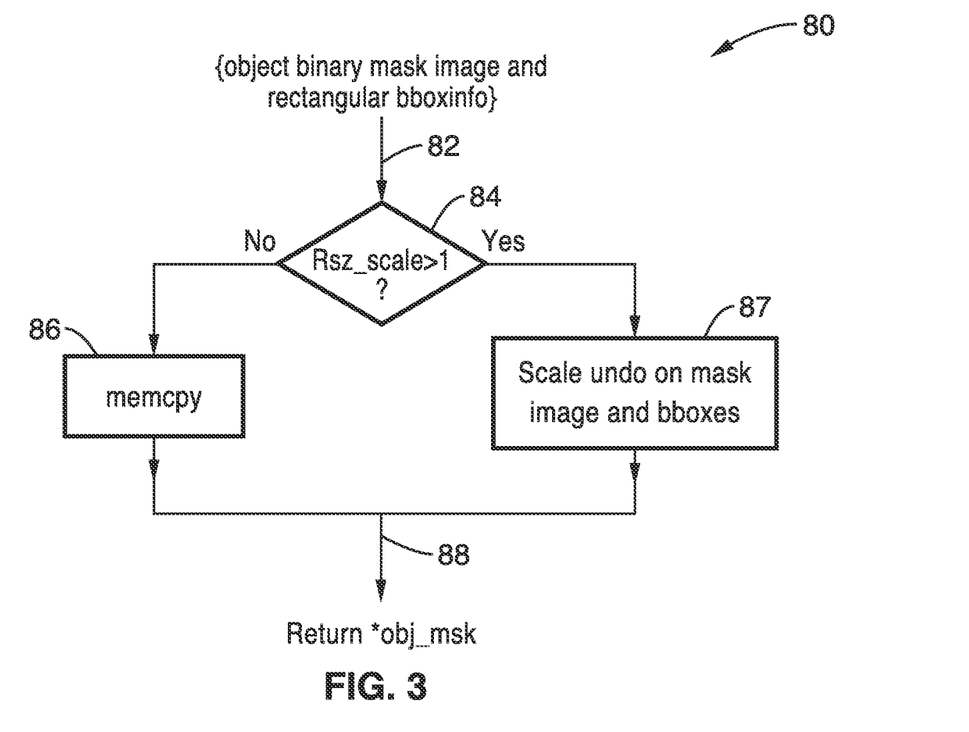
FIG. 3 is a flow diagram of static scene mask upsizing according to an embodiment of the present disclosure.

FIG. 3 illustrates an example embodiment 80 of object mask upsizing on a binary mask image 82, as was seen in block 62 of FIG. 2. If the re-size (downsize) scale in 84 that was originally set in 58 of FIG. 2 is greater than one (Rsz_scale >1?), then the object mask image and its bounding box (bbox) information are up-scaled to the original size in 87. If the re-size (downsize) scale in 84 is equal to one then the object mask image and its bounding box information is copied to the application buffer directly with a memory copy command 86 (memcpy). In either case a properly sized object mask 88 (obj_msk) is returned.

Figure 4:
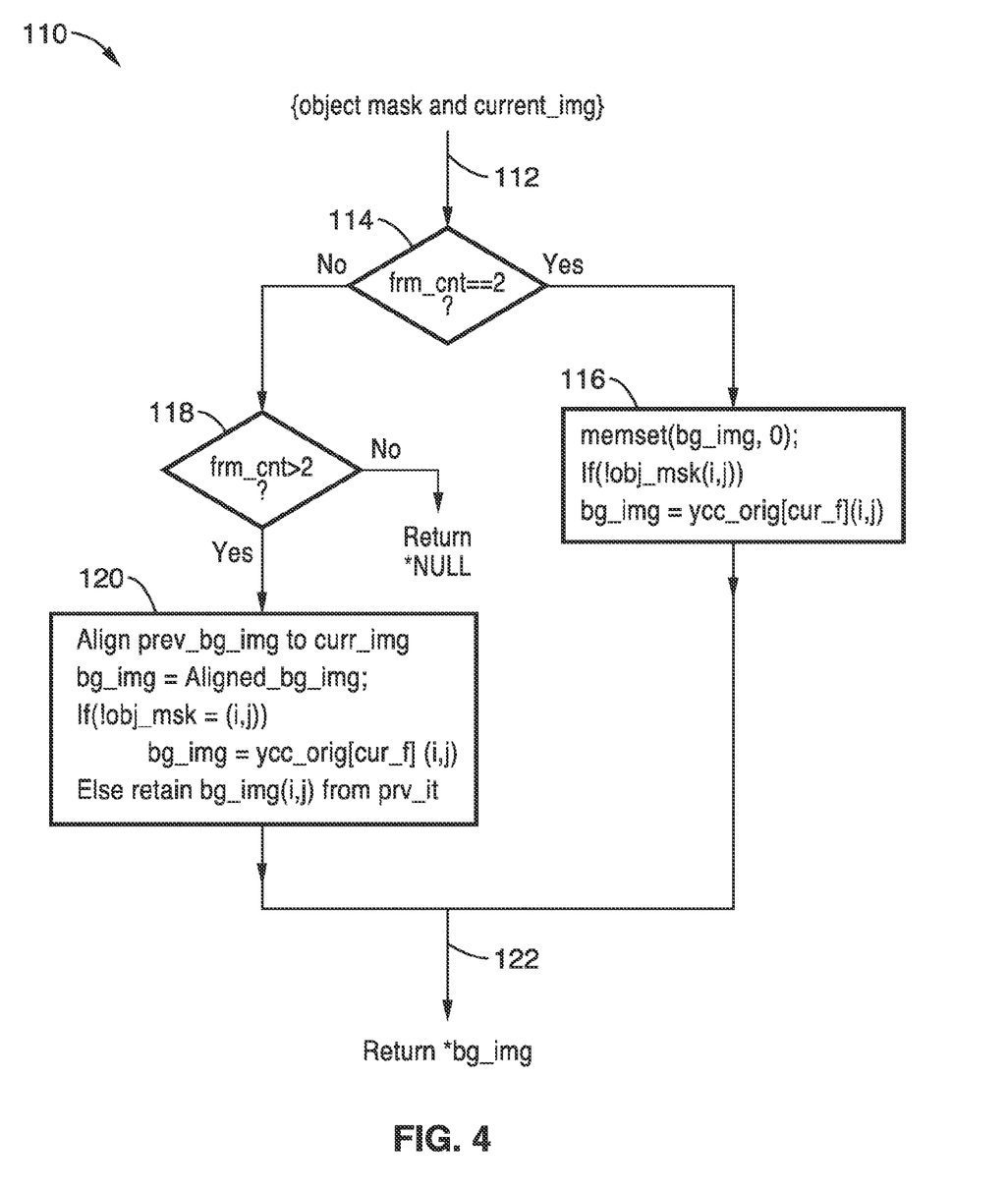
FIG. 4 is a flow diagram showing formation of a static scene for non-statically obscured regions according to an embodiment of the present disclosure.

FIG. 4 illustrates an example embodiment 110 of a static scene photo formation process for obscured regions, as was seen in block 66 of FIG. 2. Processing is performed on object mask and current image 112 until a determination is made 114 on a non-static images sequence that the frame count has reached two. At the time the frame count is equal to two, the initial background image is set to the whole frame 116 excluding the object mask regions, as represented in the block by executing memset(bg_img, 0); If(!obj_mask(i,j)) bg_img=ycc_orig[cur_f](i,j). When the frame count is determined not to be equal to two 114, and not greater than two, then two frames have not been collected for processing yet and a return is made (e.g., Return *NULL). However, if greater than two images are collected as detected in block 118, then a step is executed 120 in which the previously formed background image is aligned with the current image, and the whole current image frame excluding the object mask regions are copied to the background image. Thus, the previous background pixels are retained corresponding to current object mask regions. This process is represented in block 120 as Align prev_bg_img to curr_img, bg_img=Aligned_bg_img; if(!obj_msk=(i,j)) bg_img=ycc_orig [cur_f] (i,j), Else retain bg_img(i,j) from prev_it. Hence, the static scene pixels remain the same from the previous time instance for the current object mask areas while the static scene area in the current frame are refreshed at every frame. Therefore, after a certain number of frames, the whole static scene photo is formed 122.

Figure 5A:
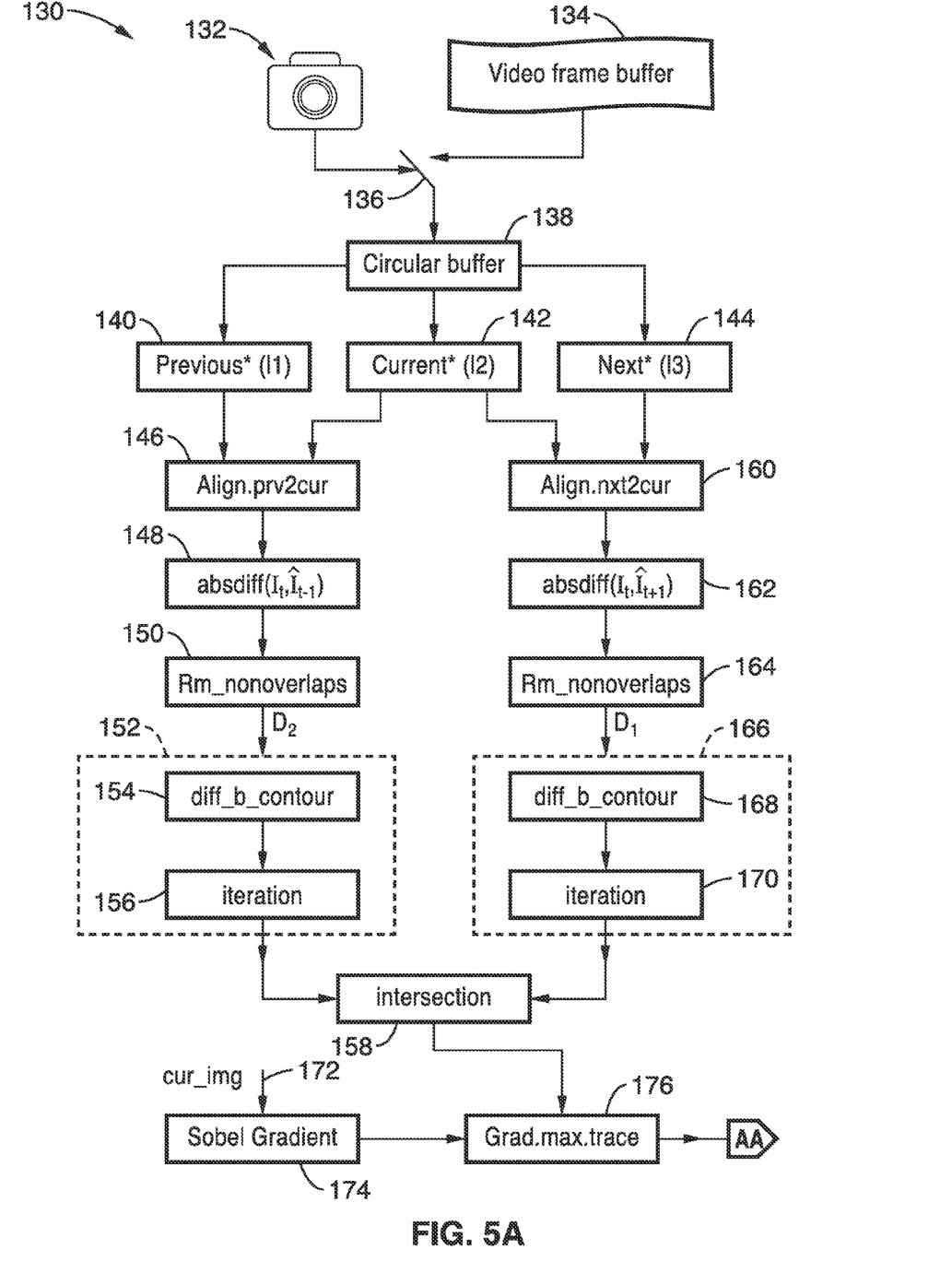
FIG. 5A and FIG. 5B are a flow diagram of object contour detection utilized according to an embodiment of the present disclosure.
Figure 5B:
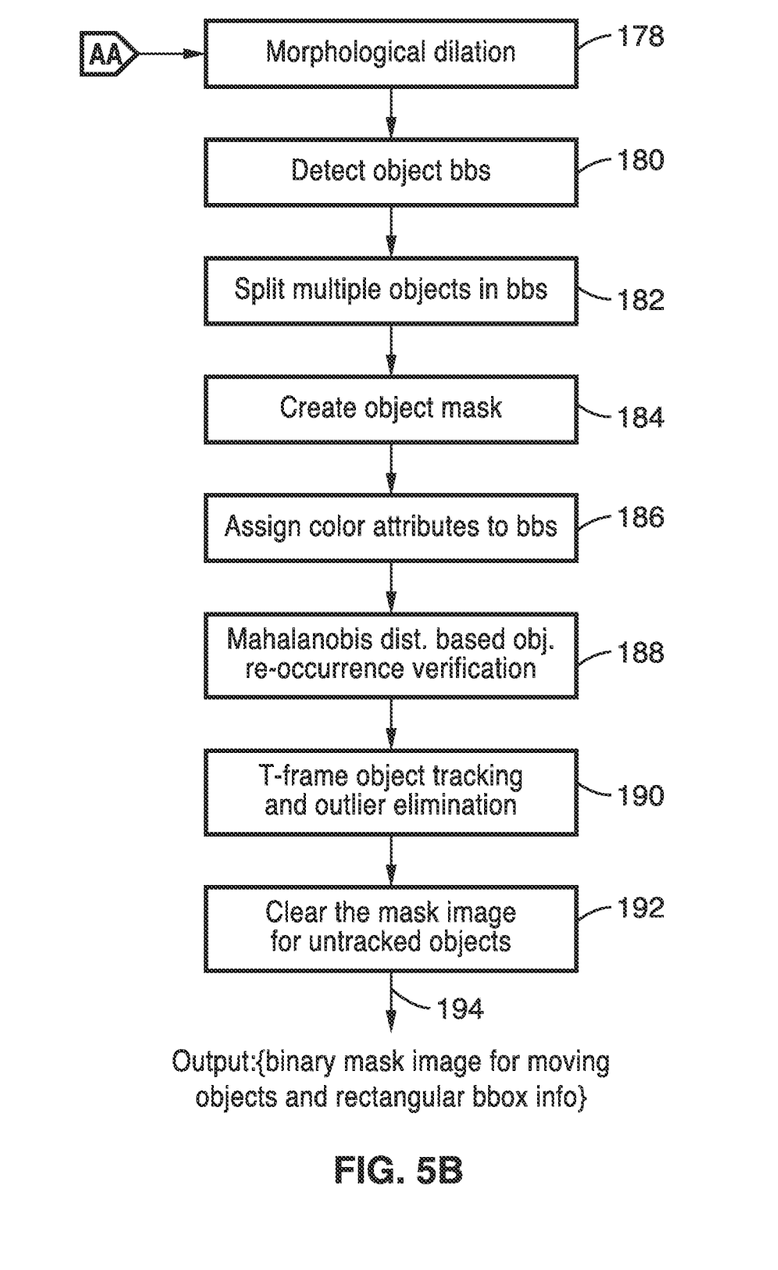

FIG. 5A and FIG. 5B illustrate additional details about the object detection and extraction method 130 in the process of generating a static scene from the sequence of images. It will be appreciated that a computer processor and memory, such as seen in FIG. 1, are preferably utilized for carrying out the steps of the inventive method, although not depicted for simplicity of illustration.

It is also seen in this figure, that the image sequence being processed may be selected 136 either from a camera 132 or from a video frame buffer 134, in which a video frame sequence is put into a circular buffer 138.

In order to detect and extract multiple moving objects, downsized images are stored in a circular buffer as was shown in FIG. 1. The tracking buffer is seen for retaining at least three consecutive images: previous 140, current 142, and next 144, as I1, I2 and I3. Separate processing paths, 146 through 156 and 160 through 170, are seen in the figure for processing inputs from both I1 and I2, or I2 and I3, respectively.

Alignment is performed 146, 160, on previous and next, respectively, with respect to static scenes in the image at every incoming frame instance utilizing a known image alignment process, preferably utilizing the global whole frame image alignment algorithm from Sony. The absolute difference is determined between the aligned I1 and I2 in 148, and likewise the aligned I3 and I2 in 162. After removing the non-corresponding (non-overlapping areas at frame borders after the alignment) redundant regions at frame borders in the difference images 150, 164, then contours 152, 166 of the objects are detected on each difference image. This can be understood by considering a video camera which is capturing video. The camera moves towards the right whereby a partially new scene is being captured that was not in the previous frame. Then, when the previous and current frames are aligned, there wouldn't be a correspondence scene at the right frame border due to non-overlapping camera field of view. That is what is considered the "Non-corresponding" area after the alignment.

It will be seen that this process of determining the contours is iterative, shown exemplified with diff_b_contours 154, 168, and iteration control iteration 156, 170. An initial object contour is determined from a first pass, with contour detection utilizing a lower sensitivity threshold for further search of object contours using the initial object contour results from the previous modules, within additional iterations, typically pre-set to two iterations. Contour detection results in creating double object contours, as in both difference images, due to the movement in time of the object. Therefore, an intersection operation is performed 158 to retain the contours of objects in current image I2 only where object contours are located.

In some cases, part of the object contour information may be missing. Accordingly, to recover missing contour information, a gradient of image I2 (from cur_img) 172 is determined 174, such as by using a Sobel gradient, and the contour is recovered utilizing gradient tracing 176, such as by utilizing a function Grad.max.trace. Preferably, this step includes a maximum connecting gradient trace operation to recover any missing object contours.

The recovered contour is output to a block which performs morphological dilation 178, as seen in FIG. 5B. The resulting object contour data is dilated to close further gaps inside the contour. An object bounding box is determined 180, such as by using a function bbs for performing bounding box (bb) for each object. Initial bounding box information of the objects is detected, preferably by utilizing vertical and horizontal projection of the dilated contour image. However, in some cases, a larger object may contain a smaller object. Therefore, a splitting process 182 is performed that is based on region growing, and which is utilized to split the multiple objects, if any, in each bounding box area to separate any non-contacting objects in each bounding box.

A mask image bounded by each object contour is created 184. In order to track objects temporally (i.e., with respect to time), color attributes of objects are extracted from the input image corresponding to object mask area and color assignments stored in the object data structure 186. Then, the objects in the current frame are verified, such as preferably utilizing Mahalanobis distance metric 188 using object color attributes, with the objects in the previous T frames (where T=1 is the default value). Then, the objects that are not verified (not tracked) in the verification stage of the T consecutive frames are considered as outliers and removed from the current object mask image 190. In at least one embodiment, the value of T is 1, although values greater than 1 can be utilized. The attributes of the removed object are preferably still retained for verification of the objects in the next frame, in the object attribute data structure.

The mask is then cleared of the untracked objects (not verified) 192 to output a binary mask 194 of moving objects and rectangular boundary box information, as a Boolean image where detected object pixel locations are set to "true", and the remainder set to "false". The information about these moving objects is then utilized for removing these objects as seen in FIG. 2 blocks 66 through 72 from the full size application buffers to arrive at a static scene.

Figure 6:
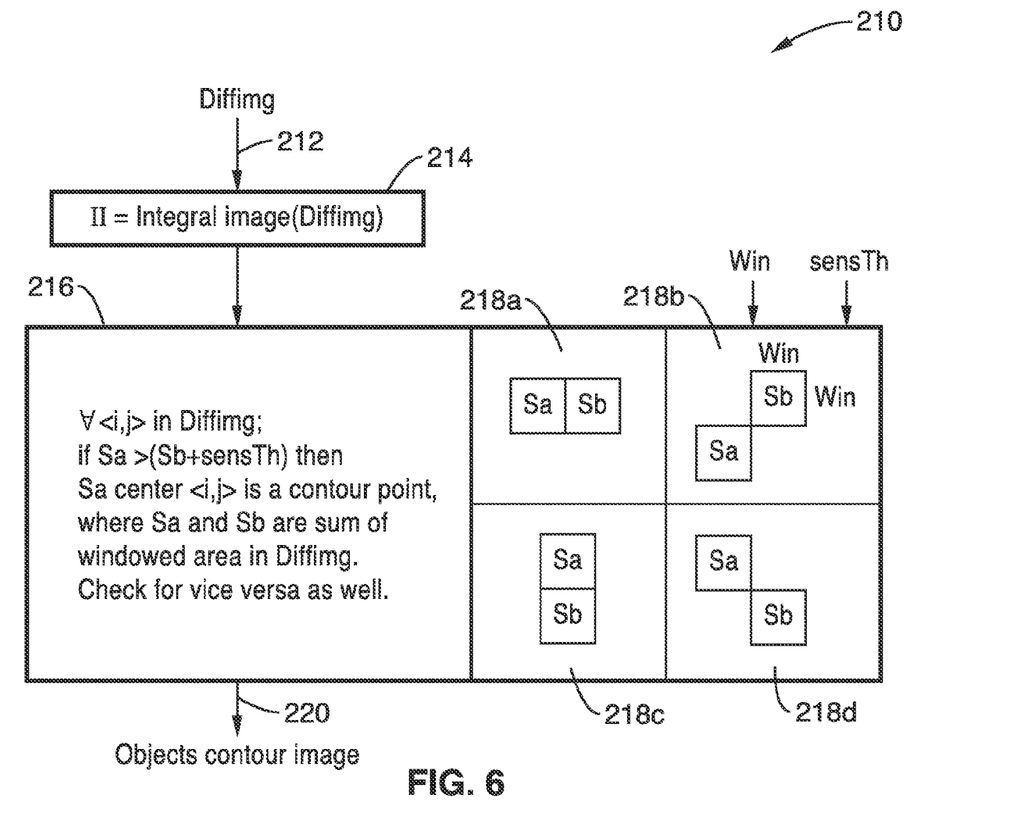
FIG. 6 is a flow diagram of object contour detection process utilizing a different image according to an embodiment of the present disclosure.

FIG. 6 illustrates the object contour detection process 210, seen in blocks 154, 168 of FIG. 5A through FIG. 5B using a difference image. Parameter diffimg 212 is received at block 214 for I1=Integral image (Diffimg). The diff_b_contour (diffimg, Win, sensTh..) method accepts three parameters: diffimg which is D2 from 150 in FIG. 5A, the Win sub-window value (typically 7×7) and sensTh as sensitivity threshold value. Block 216 in the figure executes three separate filters to detect moving object borders on the difference image: 218a is a horizontal filter, 218b is a 45 degree filter, 218c is a 90 degree filter, and 218d is a 135 degree filter. Sa and Sb represent sum of the intensity values inside each sub-window, respectively. If Sa>(Sb+sensTh), then Sa sub-window area is considered to be on a moving object contour and set to be true in that case, where sensTh is typically assigned to value of 16 per pixel (sensTh=Win×16) at the first iteration and 8 per pixel at the second iteration. Furthermore, the inventive method checks for the condition Sb>(Sa+sensTh). If that condition is true then the Sb sub-window area is set to be the moving object border. As a result the objects contour image 220 is output as moving object borders.

Referring to FIG. 6, it will be appreciated that this represents a dynamic thresholding process. In considering Sb>(Sa+sensTh) (sensitivity_threshold), it will be recognized that there is no hard-coded threshold; instead the threshold is preferably a relative threshold operation. In the present embodiment, the dynamic threshold is achieved by comparing a first sum of intensity value (e.g., Sa or Sb) against a second sum of intensity values (e.g., Sb or Sa) added to a sensitivity threshold sensTh as an offset. For example consider Sb=240, Sa=210, SensTh=16 that is 240>210+16, then the Equation would be true. Similarly, considering Sb=30, Sa=10, SensTh=16, that is 30>10+16, then again the equation would be true. On the other hand, consider the case with Sb=240, Sa=230, and SensTh=16, that is 240>230+16, whereby the equation would be false.

Embodiments of the present technology may be described with reference to flowchart illustrations of methods and systems according to embodiments of the disclosure, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the technology can be embodied in various ways, including but not limited to the following:

1. An apparatus for extracting a static scene image from a sequence of images containing moving objects, comprising: (a) at least three tracking buffers configured for retaining downsized images from a sequence of images; (b) at least two application buffers configured for retaining full size images from the sequence of images; (c) a computer processor coupled for controlling said tracking buffers and said application buffers in the processing of the sequence of images; and (d) programming in a non-transitory computer readable medium and executable on the computer processor for performing steps comprising: (i) downsizing images from a sequence of images, and storing at least three sequential images in said tracking buffers; (ii) storing at least two images in said application buffers for extracting a static scene image; (iii) performing a moving object extraction process to determine information about moving objects in said sequential image in said tracking buffers; (iv) upsizing moving object information into full size object masks which can be applied to said application buffers; (v) forming a static scene image in a first buffer of said application buffers, using static scene image formation, in response to collecting portions of a scene from a second buffer of said application buffers, which exclude the locations of full size object masks of objects determined to be moving; and (vi) processing additional images in the sequence of images until a full static background image is available in said first image buffer in which all excluded locations have been filled from other images in said sequence of images.

2. The apparatus of any of the previous embodiments, wherein said programming is configured for performing said moving object extraction process, comprising: aligning at least a previous, current and next images in said tracking buffers; determining absolute differences in relation to the current image from the previous and next images; and performing a relative threshold operation for detecting object contours in difference images that are then intersected to obtain object contours corresponding to the current image about which a bounding box is applied to generate an object mask for each moving object.

3. The apparatus of any of the previous embodiments, wherein said programming is configured to perform said detecting object contours in an iterative process in which a lower sensitivity threshold is utilized in searching for object contours in each successive iteration.

4. The apparatus of any of the previous embodiments, wherein said programming is configured to perform said moving object extraction process even when part of the object contour information is missing, by recovering missing contour information by determining an image gradient and recovering a missing contour utilizing gradient tracing.

5. The apparatus of any of the previous embodiments, wherein said tracking buffers are a circular buffer which said programming is configured to access through pointers so that receipt of successive images does not require copying images from one buffer to another.

6. The apparatus of any of the previous embodiments, wherein said programming is configured for performing upsizing of moving object information into full size object masks in response to a scaling operation on a mask image and bounding boxes.

7. The apparatus of any of the previous embodiments, wherein said programming is configured for performing said static scene image formation after at least two images in a non-static image sequence have been received.

8. The apparatus of any of the previous embodiments, wherein said programming is configured for performing said static scene image formation as a previously formed background image is aligned with a current image, and the current image excluding object mask regions are copied to this previously formed background image, so that pixels in the previously formed background image are retained corresponding to current object mask regions.

9. The apparatus of any of the previous embodiments, wherein said apparatus comprises a camera, a cellular phone with integrated camera, or other portable electronic device configured for capturing images.

10. An apparatus for extracting a static scene image from a sequence of images containing moving objects, comprising: (a) at least three tracking buffers configured for retaining downsized images from a sequence of images, said tracking buffers arranged as a circular buffer accessed through pointers whereby receipt of successive images does not require copying images from one buffer to another; (b) at least two application buffers configured for retaining full size images from the sequence of images; (c) a computer processor coupled for controlling said tracking buffers and said application buffers in the processing of the sequence of images; and (d) programming in a non-transitory computer readable medium and executable on the computer processor for performing steps comprising: (i) downsizing images from a sequence of images, and storing at least three sequential images in said tracking buffers; (ii) storing at least two images in said application buffers for extracting a static scene image; (iii) performing a moving object extraction process to determine information about moving objects in said sequential image in said tracking buffers; (iv) upsizing moving object information into full size object masks which can be applied to said application buffers; (v) forming a static scene image in a first buffer of said application buffers, using static scene image formation, in response to collecting portions of a scene from a second buffer of said application buffers, which exclude the locations of full size object masks of objects determined to be moving, so that as a previously formed background image is aligned with a current image, and the current image excluding object mask regions are copied to this previously formed background image, pixels in the previously formed background image are retained corresponding to current object mask regions; and (vi) processing additional images in the sequence of images until a full static background image is available in said first image buffer in which all excluded locations have been filled from other images in said sequence of images.

11. The apparatus of any of the previous embodiments, wherein said programming is configured for performing said moving object extraction process, comprising: aligning at least a previous, current and next images in said tracking buffers; determining absolute differences in relation to the current image from the previous and next images; and performing a relative threshold operation for detecting object contours in difference images that are then intersected to obtain object contours corresponding to the current image about which a bounding box is applied to generate an object mask for each moving object.

12. The apparatus of any of the previous embodiments, wherein said programming is configured to perform said detecting object contours in an iterative process in which a lower sensitivity threshold is utilized in searching for object contours in each successive iteration.

13. The apparatus of any of the previous embodiments, wherein said programming is configured to perform said moving object extraction process even when part of the object contour information is missing, by recovering missing contour information by determining an image gradient and recovering a missing contour utilizing gradient tracing.

14. The apparatus of any of the previous embodiments, wherein said programming is configured for performing upsizing of moving object information into full size object masks in response to a scaling operation on a mask image and bounding boxes.

15. The apparatus of any of the previous embodiments, wherein said programming is configured for performing said static scene image formation after at least two images in a non-static image sequence have been received.

16. The apparatus of any of the previous embodiments, wherein said apparatus comprises a camera, a cellular phone with integrated camera, or other portable electronic device configured for capturing images.

17. A method of extracting a static background scene from a sequence of images containing moving objects, comprising the steps of: (a) downsizing images from a sequence of images, and storing at least three sequential images in at least three tracking buffers configured for retaining downsized images from a sequence of images; (b) storing at least two images in at least two application buffers configured for retaining full size images from the sequence of images when extracting a static scene image; (c) extracting moving objects in a process to determine information about moving objects in said sequential image in said tracking buffers; (d) upsizing moving object information into full size object masks which can be applied to said application buffers; (e) forming a static scene image in a first buffer of said application buffers, using static scene image formation, in response to collecting portions of a scene from a second buffer of said application buffers, which exclude the locations of full size object masks of objects determined to be moving; and (f) processing additional images in the sequence of images until a full static background image is available in said first image buffer in which all excluded locations have been filled from other images in said sequence of images.

18. The method of any of the previous embodiments, wherein said extracting moving objects is a process, comprising: aligning at least a previous, current and next images in said tracking buffers; determining absolute differences in relation to the current image from the previous and next images; and performing a relative threshold operation for detecting object contours in difference images that are then intersected to obtain object contours corresponding to the current image about which a bounding box is applied to generate an object mask for each moving object.

19. The method of any of the previous embodiments, wherein said static scene image formation is performed as a previously formed background image is aligned with a current image, and the current image excluding object mask regions are copied to this previously formed background image, so that pixels in the previously formed background image are retained corresponding to current object mask regions.

20. The method of any of the previous embodiments, wherein said method is configured for being performed in a camera, a cellular phone with integrated camera, or other portable electronic device configured for capturing images.

Although the description above contains many details, these should not be construed as limiting the scope of the technology but as merely providing illustrations of some of the presently preferred embodiments of this technology. Therefore, it will be appreciated that the scope of the present technology fully encompasses other embodiments which may become obvious to those skilled in the art, and that the scope of the present technology is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present technology, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for extracting a static scene image from a sequence of images containing moving objects, comprising:
    (a) at least three tracking buffers configured for retaining downsized images from a sequence of images;
    (b) at least two application buffers configured for retaining full size images from the sequence of images;
    (c) a computer processor operably coupled for controlling said tracking buffers and said application buffers in the processing of the sequence of images; and
    (d) programming in a non-transitory computer readable medium and executable on the computer processor for performing steps comprising:
        (i) downsizing images from a sequence of images, and storing at least three sequential images in said tracking buffers;
        (ii) storing at least two images in said application buffers for extracting a static scene image;
        (iii) performing a moving object extraction process to determine information about moving objects in said sequential image in said tracking buffers;
        (iv) upsizing moving object information into full size object masks which can be applied to said application buffers;
        (v) forming a static scene image in a first buffer of said application buffers, using static scene image formation, in response to collecting portions of a scene from a second buffer of said application buffers, which exclude the locations of full size object masks of objects determined to be moving; and
        (vi) processing additional images in the sequence of images until a full static background image is available in said first image buffer in which all excluded locations have been filled from other images in said sequence of images.

2. The apparatus recited in claim 1, wherein said programming is configured for performing said moving object extraction process, comprising:
- aligning at least a previous, current and next image in said tracking buffers;
- determining absolute differences in relation to the current image from the previous and next images; and
- performing a relative threshold operation for detecting object contours in difference images that are then intersected to obtain object contours corresponding to the current image about which a bounding box is applied to generate an object mask for each moving object.

3. The apparatus recited in claim 2, wherein said programming is configured to perform said detecting object contours in an iterative process in which a lower sensitivity threshold is utilized in searching for object contours in each successive iteration.

4. The apparatus recited in claim 2, wherein said programming is configured to perform said moving object extraction process even when part of the object contour information is missing, by recovering missing contour information by determining an image gradient and recovering a missing contour utilizing gradient tracing.

5. The apparatus recited in claim 1, wherein said tracking buffers are a circular buffer which said programming is configured to access through pointers so that receipt of successive images does not require copying images from one buffer to another.

6. The apparatus recited in claim 1, wherein said programming is configured for performing upsizing of moving object information into full size object masks in response to a scaling operation on a mask image and bounding boxes.

7. The apparatus recited in claim 1, wherein said programming is configured for performing said static scene image formation after at least two images in a non-static image sequence have been received.

8. The apparatus recited in claim 1, wherein said programming is configured for performing said static scene image formation as a previously formed background image is aligned with a current image, and the current image excluding object mask regions are copied to this previously formed background image, so that pixels in the previously formed background image are retained corresponding to current object mask regions.

9. The apparatus recited in claim 1, wherein said apparatus comprises a camera, a cellular phone with integrated camera, or other portable electronic device configured for capturing images.

10. An apparatus for extracting a static scene image from a sequence of images containing moving objects, comprising:
(a) at least three tracking buffers configured for retaining downsized images from a sequence of images, said tracking buffers arranged as a circular buffer accessed through pointers whereby receipt of successive images does not require copying images from one buffer to another;
(b) at least two application buffers configured for retaining full size images from the sequence of images;
(c) a computer processor operably coupled for controlling said tracking buffers and said application buffers in processing the sequence of images; and
(d) programming in a non-transitory computer readable medium and executable on the computer processor for performing steps comprising:
  (i) downsizing images from a sequence of images, and storing at least three sequential images in said tracking buffers;
  (ii) storing at least two images in said application buffers for extracting a static scene image;
  (iii) performing a moving object extraction process to determine information about moving objects in said sequential image in said tracking buffers;
  (iv) upsizing moving object information into full size object masks which can be applied to said application buffers;
  (v) forming a static scene image in a first buffer of said application buffers, using static scene image formation, in response to collecting portions of a scene from a second buffer of said application buffers, which exclude the locations of full size object masks of objects determined to be moving, so that as a previously formed background image is aligned with a current image, and the current image excluding object mask regions are copied to this previously formed background image, pixels in the previously formed background image are retained corresponding to current object mask regions; and
  (vi) processing additional images in the sequence of images until a full static background image is available in said first image buffer in which all excluded locations have been filled from other images in said sequence of images.

11. The apparatus recited in claim 10, wherein said programming is configured for performing said moving object extraction process, the steps comprising:
- aligning at least a previous, current and next image in said tracking buffers;
- determining absolute differences in relation to the current image from the previous and next images; and
- performing a relative threshold operation for detecting object contours in difference images that are then intersected to obtain object contours corresponding to the current image about which a bounding box is applied to generate an object mask for each moving object.

12. The apparatus recited in claim 11, wherein said programming is configured to perform said detecting object contours in an iterative process in which a lower sensitivity threshold is utilized in searching for object contours in each successive iteration.

13. The apparatus recited in claim 11, wherein said programming is configured to perform said moving object extraction process even when part of the object contour information is missing, by recovering missing contour information by determining an image gradient and recovering a missing contour utilizing gradient tracing.

14. The apparatus recited in claim 10, wherein said programming is configured for performing upsizing of moving object information into full size object masks in response to a scaling operation on a mask image and bounding boxes.

15. The apparatus recited in claim 10, wherein said programming is configured for performing said static scene image formation after at least two images in a non-static image sequence have been received.

16. The apparatus recited in claim 10, wherein said apparatus comprises a camera, a cellular phone with integrated camera, or other portable electronic device configured for capturing images.

17. A method of extracting a static background scene from a sequence of images containing moving objects, comprising the steps of:
(a) downsizing images from a sequence of images, and storing at least three sequential images in at least three tracking buffers configured for retaining downsized images from a sequence of images;

(b) storing at least two images in at least two application buffers configured for retaining full size images from the sequence of images when extracting a static scene image;
(c) extracting moving objects in a process to determine information about moving objects in said sequential image in said tracking buffers;
(d) upsizing moving object information into full size object masks which can be applied to said application buffers;
(e) forming a static scene image in a first buffer of said application buffers, using static scene image formation, in response to collecting portions of a scene from a second buffer of said application buffers, which exclude the locations of full size object masks of objects determined to be moving; and
(f) processing additional images in the sequence of images until a full static background image is available in said first image buffer in which all excluded locations have been filled from other images in said sequence of images.

18. The method recited in claim 17, wherein said extracting moving objects is a process, comprising:

aligning at least a previous, current and next images in said tracking buffers;
determining absolute differences in relation to the current image from the previous and next images; and
performing a relative threshold operation for detecting object contours in difference images that are then intersected to obtain object contours corresponding to the current image about which a bounding box is applied to generate an object mask for each moving object.

19. The method recited in claim 17, wherein said static scene image formation is performed as a previously formed background image is aligned with a current image, and the current image excluding object mask regions are copied to this previously formed background image, so that pixels in the previously formed background image are retained corresponding to current object mask regions.

20. The method recited in claim 17, wherein said method is configured for being performed in a camera, a cellular phone with integrated camera, or other portable electronic device configured for capturing images.

* * * * *